INVENTOR
JOHN A. BUCKBEE
BY [signature]
ATTORNEY

FREQUENCY DIVIDER

Filed July 22, 1946 2 Sheets-Sheet 2

INVENTOR
JOHN A. BUCKBEE
BY [signature]
ATTORNEY

Patented Aug. 7, 1951 2,562,889

UNITED STATES PATENT OFFICE 2,562,889

FREQUENCY DIVIDER

John A. Buckbee, Fort Wayne, Ind., assignor, by mesne assignments, to Farnsworth Research Corporation, a corporation of Indiana Application July 22, 1946, Serial No. 685,332

10 Claims. (Cl. 250—27)

This invention relates to frequency dividers, and particularly relates to a step-down circuit adapted to develop output pulses at a subharmonic of the frequency of the input pulses impressed upon the circuit.

According to conventional television practice, a saw-tooth voltage wave generator which may develop a wave at the vertical scanning frequency is synchronized by high frequency synchronizing pulses which may have a frequency corresponding to the horizontal scanning frequency. A circuit of this type may be utilized, for example, for reducing the frequency of the synchronizing pulses. A conventional saw-tooth voltage wave generator comprises a condenser which is charged by a constant current device at a substantially constant rate and discharged suddenly by a space discharge tube which may be triggered by a predetermined synchronizing pulse. The synchronizing action thus depends upon the firing of the discharge tube when its grid cut-off voltage is reached. This may be effected by superimposing the synchronizing pulses upon a wave which may be of saw-tooth shape. It is quite important that the saw-tooth wave developed by a frequency divider has good linearity because the triggering action of the circuit depends upon the predetermined voltage rise of the saw-tooth wave with respect to time. Furthermore, it is highly desirable to provide a frequency divider circuit with which high count-down ratios with good stability may be obtained. With prior frequency divider circuits stable count-down ratios which are substantially higher than 10 to 1 cannot be obtained without endangering the stability of the circuit.

It is an object of the present invention, therefore, to provide a novel frequency divider with which comparatively high count-down ratios may be obtained without endangering the stability of the circuit.

A further object of the invention is to provide a step-down circuit, the count-down ratio of which depends primarily upon the peak-to-peak voltage of an auxiliary wave developed by the circuit.

In accordance with the present invention there is provided a frequency divider comprising a source of input pulses, the frequency of which is to be divided. There is also provided a saw-tooth voltage wave generator including a condenser, a device for charging the condenser and a discharge device for periodically discharging the condenser. A triggered pulse generator is provided which is normally biased beyond cut-off.

There are further provided means for impressing the saw-tooth voltage wave developed by the wave generator and the input pulses upon the pulse generator for triggering it when the combined voltage of the saw-tooth wave and one of the input pulses exceeds the biasing voltage of the pulse generator. Means are finally provided for coupling the discharge device and the pulse generator for triggering the discharge device upon firing of the pulse generator. Thus, another cycle of operation of the frequency divider is initiated.

For a better understanding of the invention, together with other and further objects thereof, reference is made to the following description, taken in connection with the accompanying drawings, and its scope will be pointed out in the appended claims.

Figure 1:
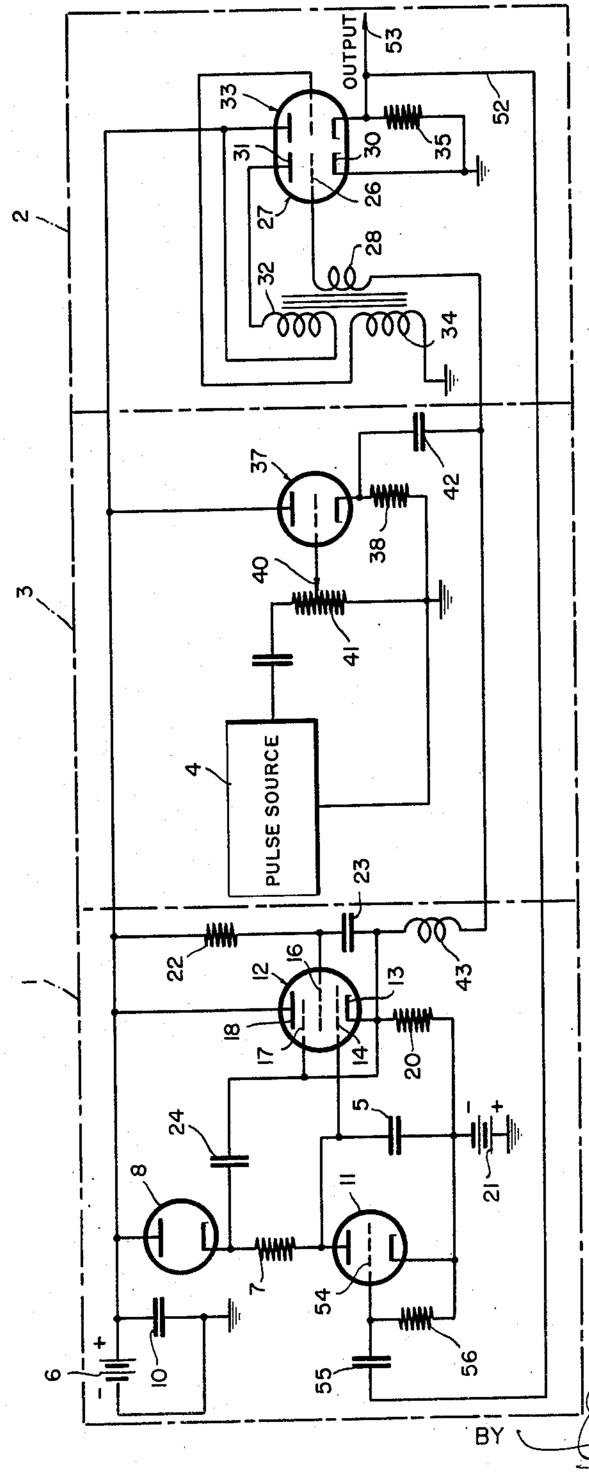
Fig. 1 is a circuit diagram of a frequency divider embodying the present invention.

Referring to Fig. 1 of the drawings, there is illustrated a frequency divider comprising a saw-tooth wave generator indicated at 1 and a triggered pulse generator indicated at 2 which may be triggered when the combined voltage of the saw-tooth wave developed by wave generator 1 and the input pulses developed by input pulse generator 3 including pulse source 4 exceeds a predetermined value. Saw-tooth voltage wave generator 1 comprises condenser 5 which is charged at a constant rate by a constant current device. To this end condenser 5 has one of its terminals connected to a positive voltage source represented, by way of example, by battery 6, through resistor 7 and diode 8. Battery 6 has its negative terminal grounded as illustrated and may be bypassed to ground for alternating frequencies by bypass condenser 10.

A substantially constant current will charge condenser 5 through diode 8 and resistor 7 arranged in series. Condenser 5 may be discharged abruptly by discharge tube 11 which may be a triode as illustrated, and which is connected across condenser 5.

In order to linearize the current flowing through diode 8 and resistor 7 into condenser 5, there is provided pentode 12 arranged as a cathode follower. Cathode follower 12 comprises cathode 13, control grid 14, screen grid 16, suppresser grid 17 and anode 18 which may be connected to the positive terminal of battery 6. Suppresser grid 17 is tied to cathode 13 which may be connected through cathode resistor 20 to a negative voltage supply indicated by way of example by battery 21 having its positive terminal grounded. Screen grid 16 is connected to battery 6 through screen grid resistor 22 and is coupled to cathode 13 through condenser 23. The junction point between resistor 7 and condenser 5 is connected to control grid 14 of cathode follower 12, while the junction point between resistor 7 and diode 8 is coupled to cathode 13 through coupling condenser 24.

When current flows from the positive terminal of battery 6 through diode 8 and resistor 7 into condenser 5, the potential at the junction point between resistor 7 and condenser 5 rises. This increasing potential is impressed upon control grid 14 of cathode follower 12. By virtue of the voltage drop across cathode resistor 20 the potential of cathode 13 will follow that of control grid 14, that is, the potential of condenser 5. Since the variations of the potential of cathode 13 are impressed through coupling condenser 24 upon the junction point between diode 8 and resistor 7, cathode follower 12 will always maintain a constant voltage drop across resistor 7. Accordingly, a constant current will flow through resistor 7 which will charge condenser 5 at a constant rate, thus building up a saw-tooth voltage wave across condenser 5. In a manner to be described hereinafter discharge tube 11 is triggered at the peak of the saw-tooth wave thereby discharging condenser 5 suddenly.

Diode 8 permits to build up a voltage across condenser 5 which is higher than that of battery 6. Since the potential of cathode 13 follows the potential of the junction point between resistor 7 and condenser 5 and is, in turn, impressed through coupling condenser 24 upon the junction point between diode 8 and resistor 7, the voltage of the terminal of resistor 7 connected to diode 8 may eventually be driven to a voltage which is higher than that of battery 6. However, diode 8 will prevent current flow from resistor 7 into battery 6 which would dissipate the voltage impressed upon the terminal of resistor 7 connected to diode 8.

A wave generator 1 of the type illustrated in Fig. 1 will develop a perfectly linear saw-tooth wave of high peak-to-peak voltage across condenser 5. It is to be understood, however, that any conventional device may be utilized for charging condenser 5 at a predetermined rate.

The saw-tooth voltage wave developed across condenser 5 is now impressed upon control grid 26 of triggered pulse generator 2 which may consist of a triggered relaxation device such as a blocking tube oscillator indicated at 27. The saw-tooth voltage wave may be obtained, for example, from cathode 13 of cathode follower 12 and may be impressed upon grid coil 28 of blocking tube oscillator 27. Cathode 30 of the blocking oscillator may be grounded as shown, while anode 31 is connected through anode coil 32 to the positive terminal of battery 6. Amplifier 33 may be coupled to blocking tube oscillator 27 by means of grid coil 34 inductively coupled to blocking oscillator coils 28 and 32. The output signal may be developed across cathode resistor 35 of amplifier 33 and obtained from output lead 53.

Blocking tube oscillator 27 is normally biased beyond cut-off because its grid 26 is conductively connected to cathode 13 of cathode follower 12 which is normally below ground potential, that is, below the potential of cathode 30 of blocking tube oscillator 27. To this end battery 21 has been provided having its negative terminal connected to cathode resistor 20. Alternatively, cathode resistor 20 may be connected to ground, while cathode 30 of blocking tube oscillator 27 may be held at a positive voltage by a suitable potentiometer connected between battery 6 and ground.

The input pulses developed by pulse source 4 are also impressed upon control grid 26 of blocking tube oscillator 27. The pulses developed by source 4 may be amplified by pulse amplifier 37 arranged as a cathode follower. The amplified pulses may be developed across cathode resistor 38, and the amplitude of the pulses may be controlled by variable tap 40 connected to resistor 41 provided between pulse source 4 and ground. The amplified pulses developed by pulse amplifier 37 may be impressed upon control grid 26 of blocking tube oscillator 27 through coupling condenser 42. Choke coil 43 may be provided between cathode 13 of cathode follower 12 and the output of pulse amplifier 37 to prevent the input pulses from being impressed upon cathode follower 12.

Figures 2, 3, 4:
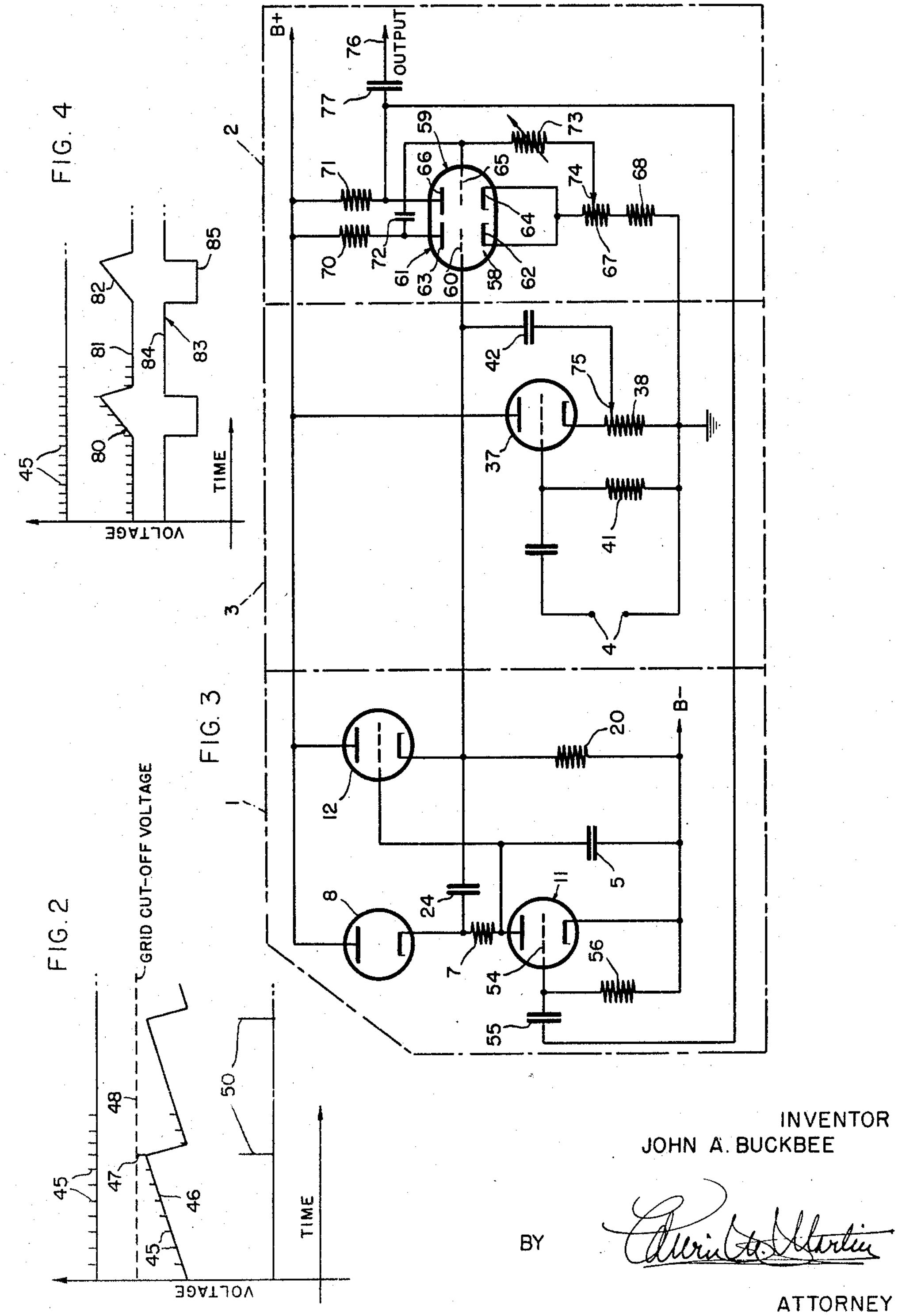
Fig. 2 is a graph representing voltages appearing at different points of the circuit of Fig. 1 and plotted against time.
Fig. 3 is a circuit diagram of a modified frequency divider in accordance with the instant invention which may be operated in two different manners.
Fig. 4 is a graph representing voltages plotted against time and appearing at different points of the frequency divider of Fig. 3 when utilized in one of its modes of operation.

The operation of the frequency divider of the invention will now be evident. Referring to Fig. 2 there are illustrated amplified input pulses 45 of positive polarity developed across cathode resistor 38 which are impressed upon control grid 26 of blocking tube oscillator 27. There is further impressed upon control grid 26 a saw-tooth wave 46 illustrated in Fig. 2 upon which high frequency input or synchronizing pulses 45 are superimposed as shown. A predetermined synchronizing pulse such as 47 riding upon saw-tooth wave 46 will exceed the grid cut-off voltage of blocking tube oscillator 27 which has been indicated at 48. Accordingly, blocking tube oscillator 27 will fire, whereupon its associated amplifier 33 also becomes conducting by virtue of the inductive coupling of coils 28, 32 and 34. A positive output pulse indicated at 50 in Fig. 2 is therefore developed across cathode resistor 35.

The frequency of output pulses 50 is a subharmonic of the frequency of input pulses 45. The step-down ratio which may be obtained with the frequency divider circuit of the invention depends primarily upon the peak-to-peak voltage of saw-tooth wave 46. Thus, assuming that the amplitude of input pulses 45 amounts to two volts, a count-down ratio of 75 to 1 should be realized if the peak-to-peak voltage of saw-tooth wave 46 amounts to 150 volts.

In accordance with the present invention there is provided a feedback path 52 from output lead 53, that is, from cathode resistor 35 of amplifier 33 to control grid 54 of discharge tube 11. Thus, output pulses 50 are impressed upon control grid 54 through coupling condenser 55 and grid leak resistor 56. Every time an output pulse 50 is developed, discharge tube 11 is fired thereby to discharge condenser 5 and to initiate another cycle of operation. Output pulses 50 may be used as the input pulses of another frequency divider which may be identical with that shown in Fig. 1 if a further frequency reduction is desired. Thus, the circuit of Fig. 1 may replace pulse source 4 in another frequency divider stage.

Referring now to Fig. 3 there is illustrated a modified frequency divider in accordance with the invention which may be operated in two different manners. The frequency divider of Fig. 3 comprises saw-tooth voltage wave generator 1 which is substantially identical with that shown in Fig. 1. However, pentode 12 arranged as a cathode follower as illustrated in Fig. 1 is now replaced by a triode. The saw-tooth voltage wave developed across condenser 5 may be obtained from the cathode of cathode follower 12 and may be impressed upon control grid 60 of blocked multivibrator 61.

Blocked multivibrator 61 may consists of a twin tube as illustrated including left-hand tube section 58 comprising cathode 62, control grid 60 and anode 63 and right-hand tube section 59 comprising cathode 64, control grid 65 and anode 66. Cathodes 62 and 64 are tied together and connected to ground through common cathode resistors 67 and 68. Anodes 63 and 66 are individually connected to the anode voltage supply indicated at B+ through anode resistors 70 and 71. Control grid 60 is connected to the cathode of cathode follower 12, while control grid 65 is coupled to anode 63 of tube section 58 through coupling condenser 72 and to cathode resistor 67 through variable grid leak resistor 73 by means of variable tap 74.

The input pulses may be impressed upon input terminals 4 and may be amplified by pulse amplifier 37 arranged as a cathode follower. The amplified input pulses may be obtained from variable tap 75 of cathode resistor 37 and may be impressed upon control grid 60 of tube section 58 of blocked multivibrator 61 through coupling condenser 42. The output signal 50 may be developed across anode resistor 71 and may be obtained from output lead 76 through coupling condenser 77.

Let it be assumed that the time constant of coupling condenser 72 and grid leak resistor 73 of blocked multivibrator 61 as well as the time constant of coupling condenser 55 and grid leak resistor 56 of discharge tube 11 are short against a cycle of operation of the frequency divider circuit.

Tube section 59 of blocked multivibrator 61 is normally conducting space current. It will be understood that tube section 58 of multivibrator 61 is coupled to tube section 59 through coupling condenser 72. On the other hand, both tube sections 58 and 59 of multivibrator 61 are coupled through cathode resistors 67 and 68.

When the breakdown voltage of tube section 58 of multivibrator 61 has been reached by the combined voltage of saw-tooth voltage wave 46 and an input pulse 45 in the manner previously explained, this section will begin to draw space current. The voltage drop developed across anode resistor 70 is impressed upon control grid 65 of tube section 59 through coupling condenser 72 thus extinguishing tube section 59 momentarily. A positive output pulse 50 will now be developed across anode resistor 71 which is impressed upon discharge tube 11 to render it conducting and to discharge condenser 5.

Due to the short time constant of coupling condenser 72 and grid leak resistor 73 the negative voltage impressed upon control grid 65 will be rapidly dissipated thus permitting tube section 59 of the multivibrator to conduct space current again. The combined space current of the two tube sections 58 and 59 flowing through cathode resistors 67 and 68 will drive cathode 62 more positive, thus extinguishing tube section 58 because the voltage of its control grid 60 is fixed. On the other hand, control grid 65 of tube section 59 is coupled to cathode resistor 67, and therefore tube section 59 will continue to conduct space current until tube section 58 is fired again as previously explained.

The frequency divider circuit of Fig. 3 may be connected in cascade if desired. To this end, output lead 76 may be connected to input terminal 4 of another frequency divider, or output lead 76 may be directly connected to control grid 60 of multivibrator tube section 58 of a succeeding stage of the frequency divider circuit.

The action of the frequency divider circuit of Fig. 3 as described, that is, its first mode of operation is substantially identical with that of the circuit of Fig. 1. It is, however, feasible to operate the frequency divider of Fig. 3 in a second mode of operation. To this end the time constant of condenser 72 and resistor 73 of multivibrator 61 as well as the time constant of condenser 55 and resistor 56 of discharge tube 11 should be made large compared to a cycle of operation of the frequency divider. Let it be assumed now that tube section 58 of blocked multivibrator 61 has just been fired. The negative charge impressed thereby upon control grid 65 of tube section 59 will not be dissipated for the major portion of a cycle of operation. Thus, the circuit may, for example, be arranged so that tube section 58 of blocked multivibrator 61 remains conducting during 90 per cent of a cycle of operation.

As long as tube section 58 remains conducting, a positive voltage is developed across anode resistor 71 which is impressed through coupling condenser 55 upon control grid 54 of discharge tube 11. In view of the large time constant of coupling condenser 55 and grid leak resistor 56, discharge tube 11 remains conducting as long as tube section 58 of multivibrator 61 remains conducting. During this period, that is, during 90 per cent of a cycle of operation condenser 5 is continuously discharged thereby to prevent a saw-tooth voltage wave from building up thereacross.

Only at the end of that period will discharge tube 11 be extinguished, that is, when tube section 59 of blocked multivibrator 61 begins to conduct space current again. The second mode of operation of the circuit of Fig. 3 has been illustrated in Fig. 4. Input pulses 45 are impressed upon control grid 60 of blocked multivibrator 61. Saw-tooth wave 80 has the shape illustrated in Fig. 4, that is, during the major portion of a cycle of operation no voltage is developed across condenser 5 as shown at 81 while saw-tooth wave 82 begins to build up at the end of that period. The output pulses which may be obtained from output lead 76 are illustrated at 83 and consist of positive portions 84 during which no saw-tooth wave is developed and negative portions 85 during which saw-tooth wave 82 is developed.

It will be obvious that the peak-to-peak voltage of portion 82 of saw-tooth wave 80 could be considerably smaller for the same count-down ratio because the wave will only build up during the last portion of the counting cycle. Alternatively, with the same peak-to-peak voltage of saw-tooth wave 80 a higher count-down ratio may be obtained. On the other hand, the operation of the circuit is dependent upon the fact that the time duration of positive pulses 84 developed by blocked multivibrator 61 can be kept within very narrow limits.

Blocking tube oscillator 27 of Fig. 1 and blocked multivibrator 61 of Fig. 3 are not strictly speaking oscillators. They are foreign driven oscillators and may, more correctly, be designated in triggered relaxation devices, that is, triggered pulse generators which develop one output pulse of high amplitude upon the arrival of a triggering pulse. It is to be understood that neither blocking tube oscillator 27 nor blocked multivibrator 61 are self-oscillating.

While it will be understood that the circuit specifications of the frequency divider of the invention may vary according to the design for any particular application, the following circuit specifications for the frequency divider of Fig. 3 operated according to its first mode of operation are included, by way of example only, as suitable for an input pulse frequency of 60 cycles:

Diode 8, Type 6X5
Cathode follower 12, type 6SG7 connected as a triode
Discharge tube 11, ½ type 6SN7
Pulse amplifier 37, ½ type 6SN7
Multivibrator 61 (tube sections 58 and 59), type 6SN7
Positive potential of anode supply voltage B+, 300 volts
Negative potential of voltage B−, 150 volts
Amplitude of input pulses 45 as obtained from pulse amplifier 37, 2 volts
Resistor 7, 4,000,000 ohms
Resistor 20, 100,000 ohms
Resistor 37, 100,000 ohms
Resistor 41, 1,000,000 ohms
Resistor 56, 15,000,000 ohms
Resistor 67, 5,000 ohms
Resistor 68, 50,000 ohms
Resistor 70, 12,000 ohms
Resistor 71, 12,000 ohms
Variable resistor 73, 2,000,000 ohms
Condenser 5, 4 microfarads
Condenser 24, 2 microfarads
Condenser 42, 1 microfarad
Condenser 55, 2 microfarads
Condenser 72, 1 microfarad
Condenser 77, 2 microfarads With the above circuit specification a countdown ratio of 14 to 1 has been obtained.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A frequency divider comprising a source of input pulses the frequency of which is to be divided; a saw-tooth voltage wave generator including a condenser, a constant current device for charging said condenser at a predetermined rate, and a discharge device connected across said condenser for periodically discharging it; a triggered pulse generator normally biased beyond cut-off, means for impressing the saw-tooth voltage wave developed by said wave generator and said input pulses upon said relaxation device for triggering it when the combined voltage of said wave and one of said input pulses exceeds the biasing voltage of said relaxation device; means coupling said discharge device and said relaxation device for triggering said discharge device upon firing of said relaxation device, thereby to initiate another cycle of operation, and means for deriving from said pulse generator output pulses at a frequency which is a subharmonic of that of said input pulses.

2. A frequency divider comprising a source of input pulses the frequency of which is to be divided; a saw-tooth voltage wave generator including a condenser, a constant current device for charging said condenser at a constant rate, and a discharge device for periodically discharging said condenser, said constant current device comprising a space discharge tube having a cathode, an anode and a control grid, a cathode impedance provided in the cathode circuit of said tube, a positive voltage supply connected to said anode, a charging impedance arranged between said voltage supply and said condenser, said cathode being coupled to the junction point between said charging impedance and said voltage supply, said grid being coupled to the junction point between said charging impedance and said condenser, thereby to impress a constant voltage difference across said charging impedance so that the current charging said condenser is constant; a triggered pulse generator normally biased beyond cut-off, means for impressing the saw-tooth voltage wave developed by said wave generator and said input pulses upon said pulse generator for triggering it when the combined voltage of said wave and one of said input pulses exceeds the biasing voltage of said pulse generator; and means for coupling said discharge device and said pulse generator for triggering said discharge device upon firing of said pulse generator, thereby to initiate another cycle of operation.

3. A frequency divider comprising a source of input pulses the frequency of which is to be divided; a saw-tooth voltage wave generator including a condenser, a constant current device for charging said condenser at a constant rate, and a discharge device for periodically discharging said condenser, said constant current device comprising a space discharge tube having a cathode, an anode and a control grid, a cathode impedance provided in the cathode circuit of said tube, a positive voltage supply connected to said anode, a charging impedance including a resistor arranged between said voltage supply and said condenser, said cathode being coupled to the terminal of said resistor coupled to said voltage supply, said grid being coupled to the terminal of said resistor coupled to said condenser, thereby to impress a constant voltage difference across said charging impedance so that the current charging said condenser is constant; a triggered blocking oscillator normally biased beyond cut-off, means for impressing the saw-tooth voltage wave developed by said wave generator and said input pulses upon said blocking oscillator for triggering it when the combined voltage of said wave and one of said input pulses exceeds the biasing voltage of said blocking oscillator; and means for coupling said discharge device and said blocking oscillator for triggering said discharge device upon firing of said blocking oscillator, thereby to initiate another cycle of operation, and means for deriving output pulses at a frequency which is a subharmonic of that of said input pulses.

4. A frequency divider comprising a source of input pulses the frequency of which is to be divided; a saw-tooth voltage wave generator including a condenser, a constant current device for charging said condenser at a constant rate, and a discharge device for periodically discharging said condenser, said constant current device comprising a space discharge tube having a cathode, an anode and a control grid, a cathode impedance provided in the cathode circuit of said tube, a positive voltage supply connected to said anode, a charging impedance provided between said voltage supply and said condenser, a unilaterally conducting device arranged between said voltage supply and said charging impedance, said cathode being coupled to the junction point between said charging impedance and said unilaterally conducting device, said grid being coupled to the junction point between said charging impedance and said condenser, thereby to impress a constant voltage difference across said charging impedance so that the current charging said condenser is constant; a triggered pulse generator normally biased beyond cut-off, means for impressing the saw-tooth voltage wave developed by said wave generator and said input pulses upon said pulse generator for triggering it when the combined voltage of said wave and one of said input pulses exceeds the biasing voltage of said pulse generator; and means for coupling said discharge device and said pulse generator for triggering said discharge device upon firing of said pulse generator, thereby to initiate another cycle of operation, and means for deriving output pulses at a frequency which is a subharmonic of that of said input pulses.

5. A frequency divider comprising a source of input pulses the frequency of which is to be divided; a saw-tooth voltage wave generator including a condenser, a device for charging said condenser, and a discharge device for periodically discharging said condenser; a triggered blocked multivibrator normally biased beyond cut-off and arranged for developing a short output signal upon being triggered, means for impressing the saw-tooth voltage wave developed by said wave generator and said input pulses upon said multivibrator for triggering it when the combined voltage of said wave and a predetermined input pulse exceeds the biasing voltage of said multivibrator; and means for coupling said discharge device and said multivibrator for impressing said short output signal developed by said multivibrator upon said discharge device, thereby to initiate another cycle of operation.

6. A frequency divider comprising a source of input pulses the frequency of which is to be divided; a saw-tooth voltage wave generator including a condenser, a constant current device for charging said condenser at a constant rate, and a discharge device for periodically discharging said condenser, said constant current device comprising a space discharge tube having a cathode, an anode and a control grid, a cathode impedance provided in the cathode circuit of said tube, a positive voltage supply connected to said anode, a charging impedance arranged between said voltage supply and said condenser, said cathode being coupled to the junction point between said charging impedance and said voltage supply, said grid being coupled to the junction point between said charging impedance and said condenser, thereby to impress a constant voltage difference across said charging impedance so that the current charging said condenser is constant; a triggered blocked multivibrator normally biased beyond cut-off and arranged for developing a short output signal upon being triggered, means for impressing the saw-tooth voltage wave developed by said wave generator and said input pulses upon said multivibrator for triggering it when the combined voltage of said wave and one of said input pulses exceeds the biasing voltage of said multivibrator; and means for coupling said discharge device and said multivibrator for triggering said discharge device upon said multivibrator being triggered, thereby to initiate another cycle of operation, and means for deriving output pulses at a frequency which is a subharmonic of that of said input pulses.

7. A frequency divider comprising a source of input pulses the frequency of which is to be divided; a saw-tooth voltage wave generator including a condenser, a device for charging said condenser at a predetermined rate, and a discharge device for periodically discharging said condenser; a blocked multivibrator comprising a first and second vacuum tube, said second vacuum tube being arranged to be normally conducting, means for impressing the saw-tooth voltage wave developed by said wave generator and said input pulses upon said first vacuum tube for rendering it conducting when the combined voltage of said wave and one of said input pulses exceeds a predetermined value, means for keeping said first vacuum tube conducting during a predetermined portion of a cycle of operation of said frequency divider; and means for coupling said multivibrator and said discharge device for triggering said discharge device when said first vacuum tube is rendered conducting and for keeping said discharge device conducting until said first vacuum tube ceases to conduct space current, thereby to prevent said charging device from charging said condenser until said first vacuum tube ceases to conduct space current.

8. A frequency divider comprising a source of input pulses the frequency of which is to be divided; a saw-tooth voltage wave generator including a condenser, a constant current device for charging said condenser at a substantially constant rate, and a discharge device for periodically discharging said condenser; a blocked multivibrator comprising a first and second vacuum tube, said second vacuum tube being arranged to be normally conducting, means for impressing the saw-tooth voltage wave developed by said wave generator and said input pulses upon said first vacuum tube for rendering it conducting when the combined voltage of said wave and one of said input pulses exceeds a predetermined value, means for keeping said first vacuum tube conducting during a major portion of a cycle of operation of said frequency divider; and means for coupling said multivibrator and said discharge device for triggering said discharge device when said first vacuum tube is rendered conducting and for keeping said discharge device conducting until said first vacuum tube ceases to conduct space current, thereby to prevent said constant current device from charging said condenser until said first vacuum tube ceases to conduct space current, and means for deriving output pulses at a frequency which is a subharmonic of that of said input pulses.

9. A frequency divider comprising a source of input pulses the frequency of which is to be divided; a saw-tooth voltage wave generator including a condenser, a constant current device for charging said condenser at a constant rate, and a discharge device for periodically discharging said condenser, said constant current device comprising a space discharge tube having a cathode, an anode and a control grid, a cathode impedance provided in the cathode circuit of said tube, a positive voltage supply connected to said anode, a charging impedance arranged between said voltage supply and said condenser, said cathode being coupled to the junction point between said charging impedance and said voltage supply, said grid being coupled to the junction point between said charging impedance and said condenser, thereby to impress a constant voltage difference across said charging impedance so that the current charging said condenser is constant; a blocked multivibrator comprising a first and second vacuum tube, said second vacuum tube being arranged to be normally conducting, means for impressing the saw-tooth voltage wave developed by said wave generator and said input pulses upon said first vacuum tube for rendering it conducting when the combined voltage of said wave and one of said input pulses exceeds a predetermined value, means for keeping said first vacuum tube conducting during a predetermined portion of a cycle of operation of said frequency divider; and means for coupling said multivibrator and said discharge device for triggering said discharge device when said first vacuum tube is rendered conducting and for keeping said discharge device conducting until said first vacuum tube ceases to conduct space current, thereby to prevent said constant current device from charging said condenser until said first vacuum tube ceases to conduct space current.

10. A frequency divider comprising a source of input pulses the frequency of which is to be divided; a saw-tooth voltage wave generator including a condenser, a constant current device for charging said condenser at a constant rate, and a discharge device for periodically discharging said condenser, said constant current device comprising a space discharge tube having a cathode, an anode and a control grid, a cathode impedance provided in the cathode circuit of said tube, a positive voltage supply connected to said anode, a charging impedance provided between said voltage supply and said condenser, a unilaterally conducting device arranged between said voltage supply and said charging impedance, said cathode being coupled to the junction point between said charging impedance and said unilaterally conducting device, said grid being coupled to the junction point between said charging impedance and said condenser, thereby to impress a constant voltage difference across said charging impedance so that the current charging said condenser is constant; a blocked multivibrator comprising a first and second vacuum tube, said second vacuum tube being arranged to be normally conducting, means for impressing the saw-tooth voltage wave developed by said wave generator and said input pulses upon said first vacuum tube for rendering it conducting when the combined voltage of said wave and one of said input pulses exceeds a predetermined value, means for keeping said first vacuum tube conducting during a major portion of a cycle of operation of said frequency divider; and means for coupling said multivibrator and said discharge device for triggering said discharge device when said first vacuum tube is rendered conducting and for keeping said discharge device conducting until said first vacuum tube ceases to conduct space current, thereby to prevent said constant current device from charging said condenser until said first vacuum tube ceases to conduct space current, and means for deriving output pulses at a frequency which is a harmonic of that of said input pulses.

JOHN A. BUCKBEE.

REFERENCES CITED

The following references are of record in the file of this patent:

UNITED STATES PATENTS

| Number | Name | Date |
|---|---|---|
| 2,255,403 | Wheeler | Sept. 9, 1941 |
| 2,277,000 | Bingley | Mar. 17, 1942 |
| 2,365,583 | Nagel et al. | Dec. 19, 1944 |
| 2,369,662 | Deloraine et al. | Feb. 20, 1945 |
| 2,375,950 | Schlesinger | May 15, 1945 |
| 2,418,425 | Poch | Apr. 1, 1947 |
| 2,422,204 | Meacham | June 17, 1947 |

OTHER REFERENCES

Wireless Engineer, August 1945, "Time-Base Converter & Frequency Divider," by Moss, pp. 368–372.